Figure 1:
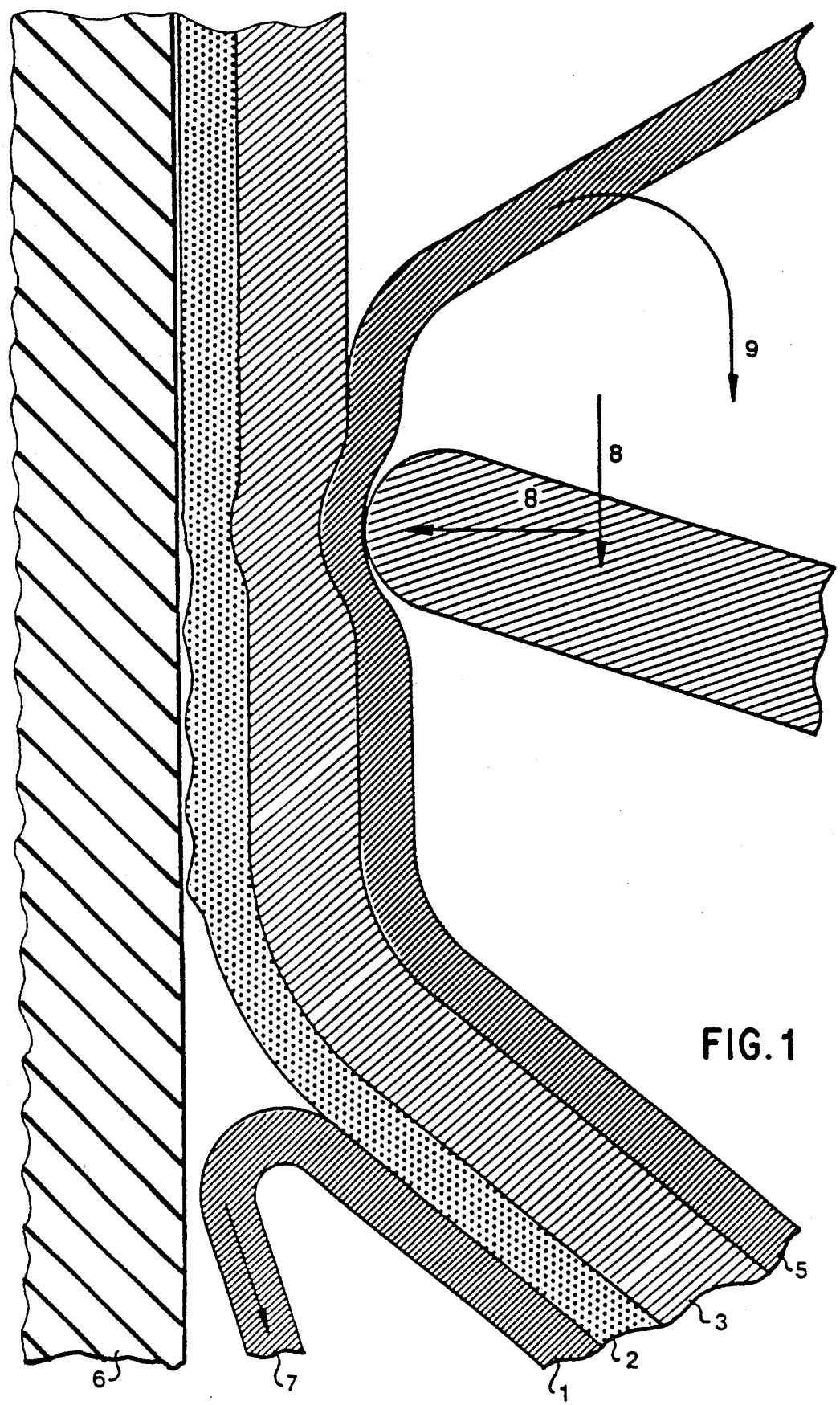

United States Patent [19]

Eissele

[11] Patent Number: 5,322,708
[45] Date of Patent: Jun. 21, 1994

[54] SELF-ADHESIVE DRY-TRANSFER DECALS, PROCESS FOR THEIR MANUFACTURE AND METHOD OF USE

[76] Inventor: Juergen Eissele, Alte Esslingerstrasse 13, D-7053 Stuttgart-Kernen 2, Fed. Rep. of Germany

[21] Appl. No.: 684,895

[22] PCT Filed: Apr. 31, 1991

[86] PCT No.: PCT/DE90/00662
§ 371 Date: Apr. 25, 1991
§ 102(e) Date: Apr. 25, 1991

[87] PCT Pub. No.: WO91/03381
PCT Pub. Date: Mar. 21, 1991

[30] Foreign Application Priority Data

Aug. 31, 1989 [DE] Fed. Rep. of Germany ....... 8900568

[51] Int. Cl.$^5$ ................................ B41M 3/12
[52] U.S. Cl. .................................. 427/147; 156/62.2; 156/230; 156/231; 156/237; 427/146; 427/152; 427/153; 427/155; 427/160; 427/208.8; 427/208.4; 428/40; 428/195; 428/354; 428/355; 428/914
[58] Field of Search ............... 428/40, 914, 343, 354, 428/355, 195, 201, 202, 204, 207, 220, 409, 906; 156/230, 62.2, 231, 237, 238, 239, 240; 427/147, 408, 152, 146, 153, 155, 160, 208.8, 208.4, 391

[56] References Cited

U.S. PATENT DOCUMENTS

| 2,647,849 | 8/1953 | Douglas et al. | 428/40 |
| 3,543,920 | 12/1970 | Crocker | 428/352 |
| 4,684,420 | 8/1987 | Bryant | 428/40 |
| 4,762,680 | 8/1988 | Pennace | 428/352 |
| 4,766,038 | 8/1988 | De Vroom | 428/447 |
| 4,771,891 | 9/1988 | Sorensen | 428/40 |
| 4,786,537 | 11/1988 | Sasaki | 428/40 |

FOREIGN PATENT DOCUMENTS

| 347483 | 8/1975 | Austria . |
| 0043578 | 1/1982 | European Pat. Off. . |
| 0189112 | 1/1986 | European Pat. Off. . |
| 0213327 | 7/1986 | European Pat. Off. . |

Primary Examiner—Ellis P. Robinson
Assistant Examiner—Nasser Ahmad
Attorney, Agent, or Firm—Wegner, Cantor, Mueller & Player

[57] ABSTRACT

A process for manufacturing a self-adhesive, dry-transfer decal at a speed greater than or equal to 2000 decals per hour comprising applying at least one color layer onto a side of a carrier paper with a release value of 40 to 80 cN as measured by 20 mm width TESA-tape K7476 at 40° C., to produce an image which adheres to the carrier paper with a release value of approximately 8 to 12 cN as measured by 20 mm width TESA-tape 651 having a measure range of 2N and a tear-off speed of 500 mm/minute, and applying an adhesive layer onto said at least one color layer such that the adhesive layer is congruent with the image.

4 Claims, 3 Drawing Sheets

SELF-ADHESIVE DRY-TRANSFER DECALS, PROCESS FOR THEIR MANUFACTURE AND METHOD OF USE

The invention concerns a self-adhesive dry-transfer decal, the procedure for its manufacture and application.

These dry-transfer decals have already been described in EP-A-0043578 and AT-B-347483, the first of which shows decals where two, three or more layers, starting with the carrier varnish and at least one color and an adhesive, are applied to one or more siliconized papers, and then covered by one or more release papers. It is said, the layers can be done in reverse order, too. More detailed information concerning the type of paper and the various layer materials is not given, and it has been proved that, without a definite and specific selection of the materials used in manufacturing dry-transfer decals, a successful manufacturing is not possible.

AT-B-347483 describes a procedure for manufacturing letterings for wreath ribbons in a screen printing process in the form of a dry-transfer decal on siliconized or waxed carrier paper, by which first a transparent protective varnish, then a color layer and finally an adhesive layer are applied, finally covered with a siliconized or waxed paper.

Similar dry-transfer decals composed of at least one release paper, at least one adhesive layer, at least one color layer, where applicable one carrier varnish layer, and at least one siliconized paper layer, are also described in U.S. Pat. No. 2,647,849. Also, from this technical state of art, it cannot be determined what the exact composition of the layers should be to obtain optimal properties for manufacturing, handling, storage and takeoff which guarantees use of this dry-transfer decal also in humid-torrid climates or under nordic-frosty winter temperatures, to apply with this dry-transfer decal decorative images or markings, for instance letterings or pictograms, preferably onto showroom windows but also to other background materials with up to a medium rough or textile surfaces.

The tasks to be solved by the invention are:
that any images can be manufactured as dry-transfer decals in any quantities and sizes and in high production speeds, can be stored in stacks, moved, easily handled and finally be applied to a multitude of background materials without having the images or decals being printed onto film materials;
that no border or film which is not part of the images is visible to the viewer;
that the decals remain attached in their entirety to the background materials under normal weather conditions such as sun, rain and cold, do not crack, and adapt themselves through their elasticity to weather- or climate-related changes in the background materials;
that the decals can be applied either to the outside or to the inside of a showroom window, and can be seen equally colored under daylight from either outside or inside;
that the decals can be scraped off easily and completely from an even window pane;
that the decals can be manufactured endless and applied machine-operated also to round, convex, concave or uneven consumer goods packings.

These tasks will be solved using a well-known layer structure, whereby the composition of layers is selected such to achieve certain peeling and release values, which will guarantee not only successful function for mass-production, storage and transportation as well as under varying climatic conditions, but also high production speeds and certain handling characteristics.

Accordingly, the carrier paper (no. 5 in FIG. 1) and the release paper (no. 1 in FIG. 1) will be selected such to prove a release value of 50 to 80 cN, measured with TESA-tape K7476, 20 mm width, tested for 24 hours at 40° C., for the carrier paper, and a release value of 15 to 35 cN under the same conditions for the release paper.

For the color layer (no. 3 in FIG. 1), a colorful, well covering paint is used which, in its physically drying version, can be printed at a speed of minimum 2,000 sheets per hour, and in its ultraviolet hardenable version at a speed of approx. 7,200 sheets per hour, both on a siliconized carrier paper (no. 5 in FIG. 1), wherby the color layer is congruent in outline and dimension with the image or picture being reproduced and adheres to the carrier paper with a release value of approx. 8 to 12 cN, measured with TESA-tape 651, 20 mm width, measure range 2 N, tear-off speed 500 mm/min. After the drying process the elasticity of the color layer must be maintained, unimportant whether screen printing, offset printing or a spraying process and whether one or more layers are used.

As a color layer (no. 3 in FIG. 1) which in the physically drying version allows the above mentioned printing speed, a paste-like PVC-polymer-mixture with organic and anorganic pigments, and esters, ketones and aromatic hydrocarbons as solvents is prefered. The PVC-polymer-mixture can be replaced by polyethylene or another plastic which might be more applicable.

A diluted dispersion adhesive is used, applied preferably in screen printing process in form of an adhesive layer (no. 2 in FIG. 1) and, depending on machinery and organisation of manufacturing, at speeds of minimum 400 to minimum 2,000 sheets per hour, whereby the adhesive layer in its whole entirety adheres automatically to the afterwards laid on siliconized release paper (no. 1 in FIG. 1) so that the release paper is not laid on loosely as in EP-A-0043578 and then fastened with staples to the carrier paper, whereby either rolling of the dry-transfer decal is prevented or the adhesive layer sticks uncontrolled by chance. This innovation substantially increases the attractiveness of the dry-transfer decal as well as simplifies its characteristics for storage, transportation and handling. When the release paper (no. 7 in FIG. 1) is pulled off from the adhesive layer the structure of the dry-transfer decal consisting of layers 2 and 3 in FIG. 1 do not remain, in whole or part, attached to it. Finally, the adhesive layer (no. 2 in FIG. 1) is extremely resistant to ultraviolet radiation from sunlight or artificial light, which preserves the adhesive's elasticity and water solubility for a long period of time, thus maintaining its simple removability. In addition, the adhesive works within a temperature range of minimum minus 302 C. to plus 100° C.

The decisive innovations in the present invention compared to EP-A-0043578 and AT-B-347483 are such that materials have been found which allow high production speeds of minimum either 400, 2,000 and 7,200 sheets per hour, and therefore permit the industrial manufacturing and the mass use of this type of decals, besides the fact that now they are available in an attractive form in view of marketing and sales, namely by the release paper automatically sticking to the adhesive layer. Until now, this last point was regarded by experts as being extremely dangerous, furthermore production speeds of 100 to 400 sheets per hour were state of art. Additionally, sizes of sheets of 140×100 cm or smaller or larger now can certainly be manufactured in those high speeds.

One for the market success especially decisive progress of the invention is the fact that, contrary to the state of art in EP-A-0043578 and AT-B-347483, a separate carrier or protective varnish layer could be cut out which results in reductions of manufacturing expenses of 33% for a one-color dry-transfer decal, and of 20% for a four-color decal. Important, too, is that where the dry-transfer decal crumbled and could only be removed with great effort in the past, now it can be scraped off from a window pane, where it was applied to for a long time like a year, very smoothly and in one piece. Previously, too, the water solubability of the adhesive, depending on the amount of ultraviolet exposure, was lost even after one, two months. The decal can be removed not only by scraping but also with the help of a solvent. Of course, first a test must be made to ensure the solvent does not damage the surface of the background material.

The high production speeds of the invention will be achieved preferably by using a white, extensive dimensionally stable carrier paper, siliconized or PE-coated on one side, with a basic weight of approximately 140 g/m$^2$, and by using a paste-like PVC-polymer-mixture as the physically drying version of the color layer (no. 3 in FIG. 1) which dries stack-proof in a drying channel at 40°-50° C. within a maximum of 30 to 50 seconds, or, in the UV-hardenable version, by using a pigmented urethane acrylate resin system which dries stack-proof in a UV-drying channel within 0.5 to 3 seconds. Furthermore, the color layer has in its physically drying version highly covering pigments with a light fastness of 5-8 wool scale (DIN 16525). This permits to avoid a color stabilizing opaque white background layer and, at four color process motifs, to screen the white content also and to print it as the fifth process color. With this the motif looks from the front and, seen against day or artificial light, from the rear equally colored, and not, through the otherwise necessary opaque white background, milky-white and the color motif only shadowy.

Continuing, on one or more color layers an adhesive layer will be applied which is preferably composed of a diluted acrylate dispersion with a peeling value of 6.8-10.8 N/inch and a tacking value of 650-850 g (Polyken Tack Tester), and which dries stack-proof in a drying channel at 40°-50° C. within maximum 90 seconds. Finally, a white release paper, siliconized or PE-coated on one side with a basic weight of approx. 80-90 g/m$^2$, is laid on the adhesive layer and sticks automatically to it, sufficient for transport, storage and handling.

As color layer in the daily work has been proven a colored, covering, paste-like paint as described on page 3. At the company of WIEDERHOLD SIEBDRUCK-FARBEN COATES BROTHERS GMBH in D-8500 Nuernberg it is marked under title LAB-N-211260. (AMENDMENT: Nowadays the paint is an acrylate system and being manufactured by the company of SERICOL GMBH in D-4430 Muelheim/Ruhr.) Equally proven is the diluted dispersion adhesive type D 146/3 or the quicker drying type D 146, available from the company of KISSEL & Wolf GMBH in D-6908 Wiesloch. For the carrier and the release paper the peeling or release values as mentioned on page 2 are essential. Delivered are the carrier paper under type 20209 and the release paper under type 20084 or 20089 from the company of SCHLEIPEN & ERKENS PAPIERVEREDLUNG GMBH in D-5170 Juelich.

To simplify the handling and positioning or adjusting of the dry-transfer decals to the intended background materials, for instance a showroom window, an instruction for use can be printed on the non-siliconized side of the carrier paper, and on that of the release paper a special bonding adhesive (such as used with "3M Post-it" memos) can be applied either in fine lines in crisscross or circular manner, or for large sheets to the top or side edges. The holding power of the bonding adhesive must be carefully chosen to allow easy separation of the individual decals, and permit positioning on a window pane for several times until the final position for applying of the image has been found.

Figure 2:
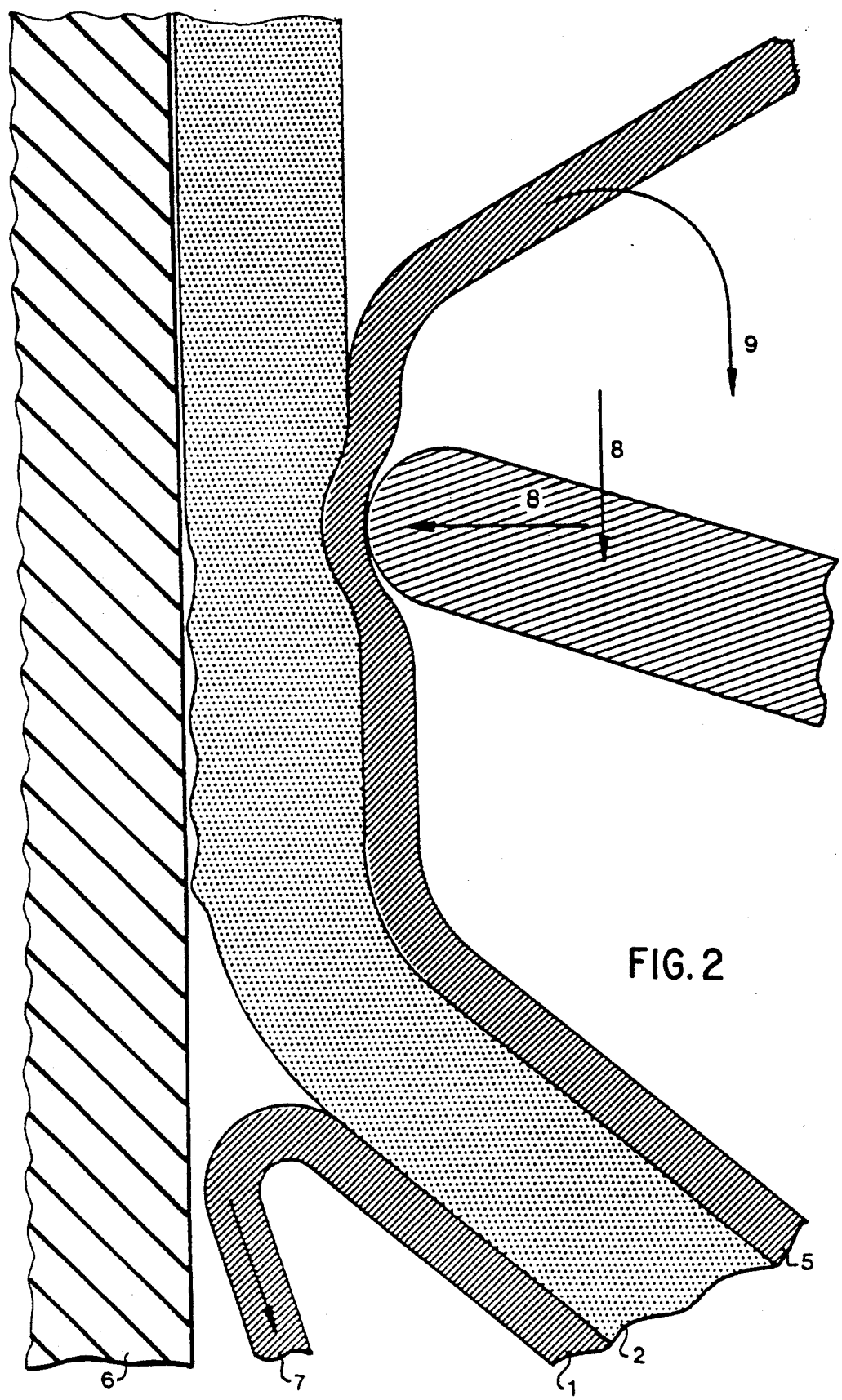

FIG. 2 shows a self-adhesive dry-transfer decal in which the separate color layer has been cut out because the adhesive layer (no. 2 in FIG. 2) can be pigmented, or inverse, the color layer carries by including an appropriate adhesive the adhesive function also.

Figure 3:
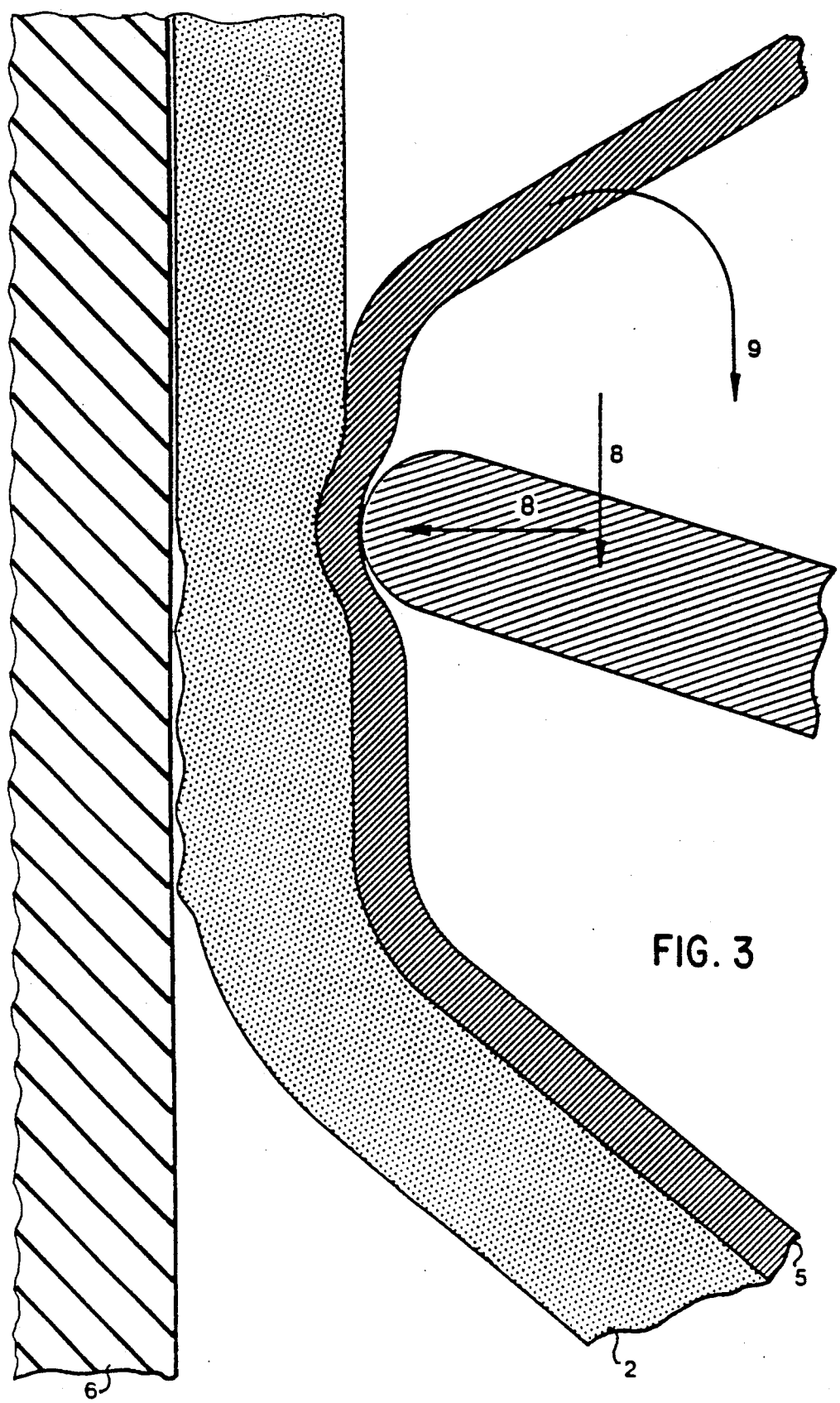

FIG. 3 sketches a self-adhesive dry-transfer decal which consists only of a carrier paper (no. 5), which covers the release paper function on the reverse side also, and colored adhesive layers (no. 2) or adhesive color layers. However, this version is unsuitable for singles but suitable for larger quantities since the decal on top must always be covered with a release paper to keep it usable, or must be discarded what is easily possible with larger quantities.

The general advantages of using this type of dry-transfer decals over the known film materials as described in EP-A-0043578 are that, even with pictures and images which contain only small amounts of illustrative elements to occur in a specific layout or perhaps are composed of fine lines spread out over a large area such as a showroom window of a dealership on the outside or inside: visible is only what should be shown as picture or image, and nothing disturbs or impedes the view of the window display as it is the case with any "clear" but always slightly clouded plastic film, self-adhesive or not, or by light reflections. There are no overlapping edges desturbing the aesthetic impression, and no material waste as with die-cut or computer-cut self-adhesive vinyls, requiring high working efforts. Furthermore, the difficult and a considerable power involving methode of using dry-transfer products like "LETRASET" and the same is avoided. And in contrast to electrostatic vinyl, the dry-transfer decals adhere to the background material for as long as intended, unimportant how smooth or uneven it may be.

The dry-transfer decals can even be applied to background materials with medium rough, uneven, concave, convex or spherical or textile surfaces and remain there as long as required, unlike other types of film or vinyl material which by physical reasons cannot be applied on such forms or materials or will detach themselves. Finally, the dry-transfer decals are as much elastic that they adjust to normal weather- or climate-related changes in the background materials without developing cracks.

The following formulas for a physically drying and an ultraviolet hardenable screen printing paint are samples of suitable paint formulas for dry-transfer decals as in FIG. 1:

1. Formula for a white screen printing paint, physically drying:
   Bonding agent/pigment ratio: 1:2

Solid content: 64%

|  | Parts of weight: |
|---|---|
| PVC-polyvinylchlorid-polymer-mixture | 24 |
| Titanium dioxide | 40 |
| Cyclohexanone | 12 |
| 2-Butoxyethylacetate | 11 |
| Naphta 100 | 13 |
|  | 100 total |

For a very quick drying version appropriate parts of butylacetate as a further solvent can be added.

2. Formula for a white screen printing paint, UV-hardenable:

Bonding agent/pigment ratio: 3:1
Solid content: 89%
Photo-initiator concentration: 7.5%

|  | Parts of weight: |
|---|---|
| Urethane-acrylate-resin | 42.0 |
| Titanium dioxide RNCX (or zinc-sulfide pigments) | 21.0 |
| Hexandioldiacrylate | 11.0 |
| Trimethylolpropanetriacrylate | 15.0 |
| Aerosil 200 | 1.0 |
| Byk P 104 S | 0.5 |
| Benzophenone | 2.5 |
| Amine | 5.0 |
| Silicone oil L 050 | 2.0 |
|  | 100.0 total |

A good balance between photo-initiator, pigment and UV-radiator is important.

Specification to description diagrams:

FIG. 1: A four layer self-adhesive dry-transfer decal
1 On one side siliconized or PE-coated release paper
2 An adhesive layer
3 One or more color layers
5 On one side siliconized or PE-coated carrier paper
6 Background material, for instance a showroom window pane
7 Removing of release paper for exposure of adhesive layer
8 Rubbing by using a small amount of pressure to bind the adhesive layer completely to the background material
9 Removing the carrier paper to expose the motif of the dry-transfer decal FIG. 2: A three layer self-adhesive dry-transfer decal
1 On one side siliconized or PE-coated release paper
2 One or more colored adhesive layers or adhesive color layers
5 On one side siliconized or PE-coated carrier paper
6, 6, 8 and 9 as in FIG. 1

FIG. 3: A Two layer self-adhesive dry-transfer decal
2 One or more colored adhesive layers or adhesive color layers
5 On both sides siliconized or PE-coated paper, i.e. on the side towards 2 for carrying and on the reverse side for releasing 6, 8 and 9 as in FIG. 1

I claim:

1. A process for manufacturing a self-adhesive, dry-transfer decal at a speed greater than or equal to 2,000 decals per hour comprising
applying at least one color layer onto a side of a carrier paper with a release value of 40 to 80 cN as measured by 20 mm width TESA-tape K7476 at 40° C., to produce an image which adheres to the carrier paper with a release value of approximately 8 to 12 cN as measured by 20 mm width TESA-tape 651 having a measure range of 2 N and a tear-off speed of 500 mm/minute, and
applying an adhesive layer onto said at least one color layer such that the adhesive layer is congruent with the image.

2. A process according claim 1, further comprising covering the image formed by the adhesive layer and least one color layer with a release paper having a release value of 15 to 35 cN as measured by 20 mm width TESA-tape K7476 for 24 hours at 40° C.

3. A process according to claim 1, wherein the adhesive layer is resistant to ultraviolet radiation and functions within a temperature range of −30° C. to 100° C.

4. A process according to claim 1, wherein the second side of said carrier paper has a release value of 15 to 35 cN as measured by 20 mm width TESA-tape K7476 for 24 hours at 40° C.

* * * * *